115,950

UNITED STATES PATENT OFFICE.

WILLIAM GILHAM, OF RICHMOND, VIRGINIA.

IMPROVEMENT IN PROCESSES AND APPARATUS FOR THE MANUFACTURE OF SPARKLING WINES.

Specification forming part of Letters Patent No. 115,950, dated June 13, 1871.

I, WILLIAM GILHAM, of the city of Richmond and State of Virginia, have invented a new and Improved Process and Apparatus for the Manufacture of Sparkling Wine by its own fermentation in bulk, of which the following is a specification:

Nature and Objects of the Invention.

The object of my invention is to produce sparkling wine in bulk, or on a large scale, by causing the wine to become charged, under great pressure, with the carbonic-acid gas generated by itself during the process of fermentation, thus forming a natural sparkling wine similar to that which has hitherto only been produced on a small scale by bottling unfermented wine, and not a factitious article, such as may be produced by the injection therein of gas derived from other sources.

The first part of my invention relates to the process above alluded to, the essential part of which consists in confining the wines in an incipient state of fermentation, and in large quantities, within strong and tight vessels, provided with proper tubes or pipes and valves or cocks, until the wine shall have sufficiently fermented to become charged with gas under any proper degree of pressure, when it may be drawn off and bottled, thus greatly reducing the expense and difficulty incurred in producing wines of this class.

The second part of the invention relates to the apparatus by which the above result is effected, illustrative forms of which will be hereinafter described, as follows: First, an exterior metallic casing or wine-tank, made so as to be air or gas tight under strong interior pressure, and adapted to contain an interior open vessel of wood or other proper material, the apparatus being provided with a series of pipes and cocks for filling and drawing off its contents, and also with a safety-valve and pressure-gage. Second, a metallic wine-tank, as above, containing an interior vessel provided with a tight head or cover, and having a system of pipes, &c., arranged in a manner slightly differing from the first. Third, a triple or three way valve-cock, which is preferably used as a substitute for the arrangement of pipes and cocks shown and described under first.

Description of the Accompanying Drawing.

Figure 1:
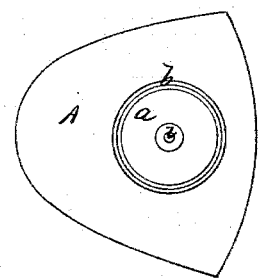
Figure 2:
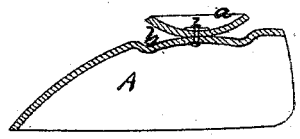
Figure 3:
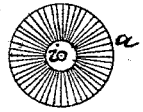

Figure 1 is a vertical section illustrating the first form of my apparatus. Fig. 2 is a vertical section, on a larger scale, illustrating the second form thereof, having an arrangement adapted to act as a safety, pressure, and vacuum valve. Fig. 3 is a vertical section illustrative of a wine-tank with flanged cast-metal head, having a triple or three way cock attached. Fig. 4 is a sectional elevation of my improved triple valve-cock. Fig. 5 is a horizontal section of the same on the line $x\,x$, Fig. 4.

General Description.

A represents an exterior metallic casing or wine-tank, made preferably of wrought-iron, and of sufficient strength to resist an interior pressure of one hundred and fifty pounds or more to the square inch, and supported in suitable manner. It is made in two parts, so that access may be had to its interior when required. These may be equal-flanged cylinders united by bolts, as shown in Fig. 1; or a plate-iron cylinder with cast-iron cap, as shown in Fig. 4, may be employed, the joints in either case being made gas-tight by packing. B is a cylinder or cask, which may be of wood and either open or closed at top. It nearly fills the interior of the tank A, but may be removed therefrom when necessary.

In that form of apparatus shown in Fig. 1 the tank has three openings for the reception of the pipes C D E, two of which communicate with the air-space above the wine in the cask B, while the third, E, is a duplicate pipe, one branch of which passes downward to within a few inches of the bottom of the cask, while the other extends to the bottom of the same. Both may have a common cock. The pipes C and D, to the former of which is connected a safety-valve and to the latter a pressure-gage, are also provided with cocks. These pipes open into the space above the liquid.

In the apparatus shown in Fig. 2 the cask B is provided with a tight head, B', having three apertures for the insertion of the pipes C D E, while a fourth aperture is formed in the head of the tank A for the reception of the curved pipe F, which forms a branch of 4. The compound three-way cock H, having three sets of openings, $h\ h^3\ h^1\ h^4\ h^2\ h^5$, provided with conical valves or plugs $h^6\ h^7\ h^8$, substantially as and for the purposes specified.

5. The flanged wrought or plate metal tank A, having a cast-metal head, $A^2$, with a single opening, $a^2$, in combination with the three-way cock H, pipes C D E, and interior vessel B, substantially as and for the purposes described.

To the foregoing specification of my improved process and apparatus for manufacturing sparkling wine by its own fermentation in bulk I have set my hand this 20th day of April, 1871.

WILLIAM GILHAM.

Witnesses:
   JOHN OTT,
   JOHN EVANS, Jr.

JAMES P. GILLESPIE.

Improvement in Atmospheric Pressure Attachments for Dental Plates.

No. 115,951.                        Patented June 13, 1871.

Witnesses: Geo. H. Strong, J. Fitzgerald

Inventor: Jas. P. Gillespie
By his Attys Dewey & Co.